US011950350B2

(12) United States Patent
Ha et al.

(10) Patent No.: US 11,950,350 B2
(45) Date of Patent: Apr. 2, 2024

(54) RADIO WAVE RADIATING DEVICE AND OVEN HAVING SAME

(71) Applicant: LG Electronics Inc., Seoul (KR)

(72) Inventors: Junghyeong Ha, Seoul (KR); Sunghun Sim, Seoul (KR); Yunbyung Chae, Seoul (KR); Chaehyun Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 17/061,174

(22) Filed: Oct. 1, 2020

(65) Prior Publication Data

US 2021/0352778 A1 Nov. 11, 2021

(30) Foreign Application Priority Data

May 11, 2020 (KR) ........................ 10-2020-0056123

(51) Int. Cl.
*H05B 6/72* (2006.01)
*H01Q 1/38* (2006.01)
(Continued)

(52) U.S. Cl.
CPC ................. *H05B 6/72* (2013.01); *H01Q 1/38* (2013.01); *H05B 6/6402* (2013.01); *H05B 6/707* (2013.01)

(58) Field of Classification Search
CPC .......... H05B 6/64; H05B 6/6402; H05B 6/68; H05B 6/686; H05B 6/688; H05B 6/70;
(Continued)

(56) References Cited

U.S. PATENT DOCUMENTS 8,994,595 B2 * 3/2015 Huang .................. H01Q 1/243 343/702
9,967,925 B2 5/2018 Brill
(Continued)

FOREIGN PATENT DOCUMENTS

| | | |
|---|---|---|
| EP | 2204880 | 7/2010 |
| KR | 1020140012856 | 2/2014 |
| WO | WO2019120077 | 6/2019 |

OTHER PUBLICATIONS

Extended European Search Report in European Appln. No. 20212827.8, dated May 11, 2021, 9 pages.

*Primary Examiner* — Hung D Nguyen
(74) *Attorney, Agent, or Firm* — Fish & Richardson P.C.

(57) ABSTRACT

A radio wave radiating device includes: a radio wave supply unit extending in one direction, one end of the radio wave supply unit being connected to a power source, an earth part spaced apart from the radio wave supply unit by a predetermined distance in a direction intersecting with the one direction, extending in the one direction, one end of the earth part being connected to a ground, and a radiating element connected to another end of the radio wave supply unit and another end of the earth part, respectively, and configured to radiate a radio wave received from the radio wave supply unit. The radiating element includes a middle portion connecting the radio wave supply unit and the earth part, a first radiating portion extending in a direction away from the earth part, and a second radiating portion extending in a direction away from the radio wave supply unit.

19 Claims, 8 Drawing Sheets

(51) Int. Cl.
*H05B 6/64* (2006.01)
*H05B 6/70* (2006.01)

(58) Field of Classification Search
CPC .......... H05B 6/705; H05B 6/707; H05B 6/72; H05B 6/76; H01Q 1/2291; H01Q 1/242; H01Q 1/243; H01Q 1/36; H01Q 1/38; H01Q 1/48
See application file for complete search history.

(56) References Cited

U.S. PATENT DOCUMENTS

| | | | | |
|---|---|---|---|---|
| 2010/0164830 | A1* | 7/2010 | Huang | H01Q 9/0421 343/846 |
| 2011/0074636 | A1 | 3/2011 | Tsai et al. | |
| 2012/0146865 | A1* | 6/2012 | Hayashi | H01Q 5/392 343/750 |
| 2020/0128170 | A1 | 4/2020 | Yoo et al. | |
| 2020/0321699 | A1* | 10/2020 | Pan | H01Q 5/50 |

* cited by examiner

RADIO WAVE RADIATING DEVICE AND OVEN HAVING SAME

CROSS-REFERENCE TO RELATED APPLICATION

Pursuant to 35 U.S.C. § 119(a), this application claims the benefit of the earlier filing date and the right of priority to Korean Patent Application No. 10-2020-0056123, filed on May 11, 2020, the contents of which is incorporated by reference herein in its entirety.

TECHNICAL FIELD

The present disclosure relates to a radio wave radiating device and an oven having the same, and more particularly, a radio wave radiating device with a structure having an optimal radiation efficiency at plural frequency bands and capable of miniaturization, and an oven having the same.

BACKGROUND

Oven is a collective term for cooking appliances designed for cooking with heat by sealing and heating cooking ingredients. Ovens are widely used due to their ease of operation.

Ovens can heat cooking ingredients in a variety of ways. For example, an oven can heat cooking ingredients in a manner of microwave heating, infrared heating, or convection heating.

Among the variety ways performed by the ovens, an oven using microwaves is called a microwave oven (or a microwave range). Microwave ovens are most widely used because of their simplicity in structure and convenience in use.

Inside the microwave oven, a space is defined. Cooking ingredients are accommodated in the space, and microwaves for heating the cooking ingredients are introduced therein. Microwaves are generated from an external power source, pass through a waveguide, and are introduced into the space.

In the space, an electromagnetic wave radiating device is provided. The electromagnetic wave radiating device radiates microwaves introduced through the waveguide into the space. The radiated microwave collides with an inner wall of a metallic material surrounding the space, and can move toward the accommodated cooking ingredients. An antenna or similar components can be used as the electromagnetic wave radiating device.

A part of the electromagnetic wave radiating device is connected to the waveguide by a connector. In addition, another part of the electromagnetic wave radiating device is disposed on the inner wall of the inner space of the oven for miniaturization and is connected to a ground that is electrically connected to an earth.

Due to a ground effect, an electromagnetic wave in a lower band compared to a length of an actual electromagnetic wave radiating device can be radiated through the electromagnetic wave radiating device.

When there is only one part in which electromagnetic waves are radiated in the electromagnetic wave radiating device, a band having a maximum radiation efficiency is provided as a single band.

However, ovens are used for heating various cooking ingredients, and an optimum frequency band for heating cooking ingredients can vary depending on a type of cooking ingredient and a type of cooking.

A conventional oven may have one radiating portion. Specifically, the conventional oven may include an antenna having one end connected to a ground, a middle portion connected to a waveguide, and another end formed as a radiating portion.

However, since the conventional oven includes only one radiating portion, a band having a maximum radiation efficiency is provided as a single band.

That is, a limitation exists in that there is no consideration on providing an optimal heating efficiency for various cooking ingredients and cooking.

SUMMARY

The present disclosure is directed to a radio wave radiating device having a structure.

According to one aspect of the subject matter described in this application, a radio wave radiating device includes a radio wave supply unit configured to transmit a radio wave and extending in one direction, one end of the radio wave supply unit being electrically connected to an external power source, an earth part spaced apart from the radio wave supply unit by a predetermined distance in a direction intersecting with the one direction, extending in the one direction, one end of the earth part being electrically connected to a ground, and a radiating element electrically connected to another end of the radio wave supply unit and another end of the earth part, respectively, and configured to radiate the radio wave received from the radio wave supply unit. The radiating element includes a middle portion connecting the radio wave supply unit and the earth part, a first radiating portion extending from the middle portion connected to the earth part, in a direction away from the earth part and the middle portion, and a second radiating portion extending from an end of the middle portion connected to the radio wave supply unit, in a direction away from the radio wave supply unit and the middle portion.

Implementations according to this aspect can include one or more of the following features. For example, the radiating element can have a cross section in a rectangular shape.

In some implementations, the middle portion can be provided in a curved shape extending in a direction that intersects a virtual line connecting the another end of the radio wave supply unit and the another end of the earth part in a shortest distance. In some implementations, the middle portion can include a bending pattern extending in one direction in a curved shape, and the one direction can be a direction that intersects a virtual line connecting the another end of the radio wave supply unit and the another end of the earth part in a shortest distance.

In some examples, the middle portion can include at least one first bending pattern extending in one direction in a curved shape and at least one second bending pattern extending in another direction that is different from the one direction in a curved shape. The one direction and the another direction can be directions that intersect a virtual line connecting the another end of the radio wave supply unit and the another end of the earth part in a shortest distance.

In some examples, the first bending pattern and the second bending pattern can be disposed on a same plane. In some examples, the one direction in which the first bending pattern extends and the another direction in which the second bending pattern extends can be opposite directions.

In some implementations, the first bending pattern can be provided to extend in the one direction in a curved shape and the second bending pattern can be provided to extend in the another direction in a curved shape. In some examples, the first bending pattern can include a pair of first extending members extending in the one direction and spaced apart from each other by a predetermined distance in a direction connecting the another end of the radio wave supply unit and the another end of the earth part in a shortest distance and a first connecting member configured to connect each first end of each of the pair of first extending members to each other. At least a portion of each of the pair of first extending members can overlap each other in the direction connecting the another end of the radio wave supply unit and the another end of the earth part in the shortest distance.

In some examples, each of portions where the pair of first extending members and the first connecting member are connected can be provided in a curved shape. In some examples, each of the first extending members and the first connecting member can be connected to each other at a predetermined angle.

In some implementations, the second bending pattern can include a pair of second extending members extending in the another direction, and spaced apart from each other by a predetermined distance in a direction connecting the another end of the radio wave supply unit and the another end of the earth part in a shortest distance and a second connecting member configured to connect each first end of each of the pair of second extending members to each other. At least a portion of each of the pair of second extending members can overlap each other in the direction connecting the another end of the radio wave supply unit and the another end of the earth part in the shortest distance.

In some examples, each of portions where the pair of second extending members and the second connecting member are connected can be provided in a curved shape. In some examples, each of the second extending members and the second connecting member can be connected to each other at a predetermined angle.

In some implementations, at least one of the first radiating portion or the second radiating portion can include a bending pattern extending in one direction in a curved shape. The one direction can be a direction intersecting an extending direction of at least one of the first radiating portion or the second radiating portion. In some examples, the bending pattern can include a pair of extending members extending in the one direction in a curved shape and spaced apart from each other by a predetermined distance in the extending direction of at least one of the first radiating portion or the second radiating portion and a connecting member configured to connect each first end of each of the pair of extending members to each other in the extending direction. At least a portion of each of the pair of extending members can overlap each other in the extending direction of at least one of the first radiating portion or the second radiating portion.

In some implementations, at least one of the first radiating portion or the second radiating portion can include at least one first bending pattern extending in one direction in a curved shape and at least one second bending pattern extending in another direction that is different from the one direction. The one direction and the another direction can be directions intersecting an extending direction of at least one of the first radiating portion or the second radiating portion.

In some examples, the first bending pattern can include a pair of first extending members extending in the one direction and spaced apart from each other by a predetermined distance in the extending direction of at least one of the first radiating portion or the second radiating portion and a first connecting member configured to connect each first end of each of the pair of first extending members to each other. At least a portion of each of the pair of first extending members can overlap each other in the extending direction of at least one of the first radiating portion or the second radiating portion. The second bending pattern can include a pair of second extending members extending in the another direction and spaced apart from each other by a predetermined distance in the extending direction of at least one of the first radiating portion or the second radiating portion and a second connecting member configured to connect each first end of each of the pair of second extending members to each other. At least a portion of each of the pair of second extending members can overlap each other in the extending direction of at least one of the first radiating portion or the second radiating portion.

According to another aspect of the subject matter described in this application, an oven includes a housing defining a cavity, a radio wave supply unit configured to transmit a radio wave and extending in one direction toward an inner wall of the cavity, one end of the radio wave supply unit being electrically connected to an external power source that is located outside the cavity, an earth part spaced apart from the radio wave supply unit by a predetermined distance in a direction intersecting the one direction and extending in the one direction to be coupled to the inner wall of the cavity, and a radiating element electrically connected to another end of the radio wave supply unit and an end of the earth part, respectively, and configured to radiate the radio wave received from the radio wave supply unit toward the cavity. The radiating element includes a middle portion connecting the radio wave supply unit and the earth part, a first radiating portion extending from the middle portion connected to the earth part, in a direction away from the earth part and the middle portion, and a second radiating portion extending from an end of the middle portion connected to the radio wave supply unit, in a direction away from the radio wave supply unit and the middle portion.

Implementations according to this aspect may include one or more following features. For example, the middle portion can be provided in a curved shape extending in a direction that intersects a virtual line connecting the another end of the radio wave supply unit and the end of the earth part in a shortest distance.

According to an implementation, the following effects can be achieved.

First, in some implementations, the radio wave radiating device includes a plurality of radiating portions. Accordingly, a plurality of antennas with different lengths can be implemented in one radio wave radiating device.

Since each antenna has a different length, each antenna has a maximum radiation efficiency in different frequency bands.

Accordingly, the radio wave radiating device having a plurality of radiating portions has a maximum radiation efficiency in different frequency bands.

Therefore, a pattern for heating cooking ingredients at various frequencies, and an optimal heating pattern for the cooking ingredients can be provided.

As a result, a performance of uniformly heating the cooking ingredients and a performance of defrosting the cooking ingredients can be improved, and a time duration required for cooking can be shortened.

In addition, in some implementations, a part of the radio wave radiating device is electrically connected to a waveguide, and another part thereof is electrically connected to an earth.

Therefore, since a ground effect is generated by an electrical connection with the earth, a radio wave in a lower band compared to a length of an actual radio wave radiating device can be radiated through the radio wave radiating device.

In addition, radiating portions are formed to extend from a portion electrically connected to the waveguide and from a portion electrically connected to the earth, respectively. And a connecting member connecting between the portion electrically connected to the waveguide and the portion electrically connected to the earth is provided in a curved shape.

Accordingly, a shortest distance between the portion electrically connected to the waveguide and the portion electrically connected to the earth can be shorter than an actual length of the connecting member while having a maximum radiation efficiency at plural frequency bands. Accordingly, the radio wave radiating device can be miniaturized.

In addition, when a difference between plural frequency bands having maximum radiation efficiency is large, the length of the connecting member can be increased. However, the shortest distance between the portion electrically connected to the waveguide and the portion electrically connected to the earth can be shorter than the actual length of the connecting member.

That is, when a difference between plural frequency bands having a maximum radiation efficiency is large, the radio wave radiating device can be miniaturized.

DETAILED DESCRIPTION

Hereinafter, a radio wave radiating device and an oven will be described in detail with reference to the accompanying drawings.

The term "oven" used hereinafter refers to an arbitrary device capable of accommodating cooking ingredients in a space provided therein, and heating the cooking ingredients. In some implementations, the oven can be implemented as a microwave oven or the like.

The term "radio wave" used in the following description may refer to an electromagnetic wave in a wavelength of infrared rays or higher, which is a wavelength of 3 KHz to 106 MHz. In some implementations, a radio wave can be a microwave.

As used in the following description, the expression "electrical connection" may refer to a state in which two or more members are connected so that a current or an electric signal is transmitted. The electrical connection can be implemented in a wired form by contact between members of a conductive material or by conductor members or the likes. In some implementations, the electrical connection can be implemented in a wireless form.

The term "extending in one direction in a curved shape" used in the following description may refer to an end that extends in one direction by a predetermined length, bent to extend in a direction intersecting with the one direction, and then bent to extend in a direction opposite to the one direction, in a sequential manner. When extending in one direction in a curved shape, the entire curved portion protrudes in one direction.

Figure 1:
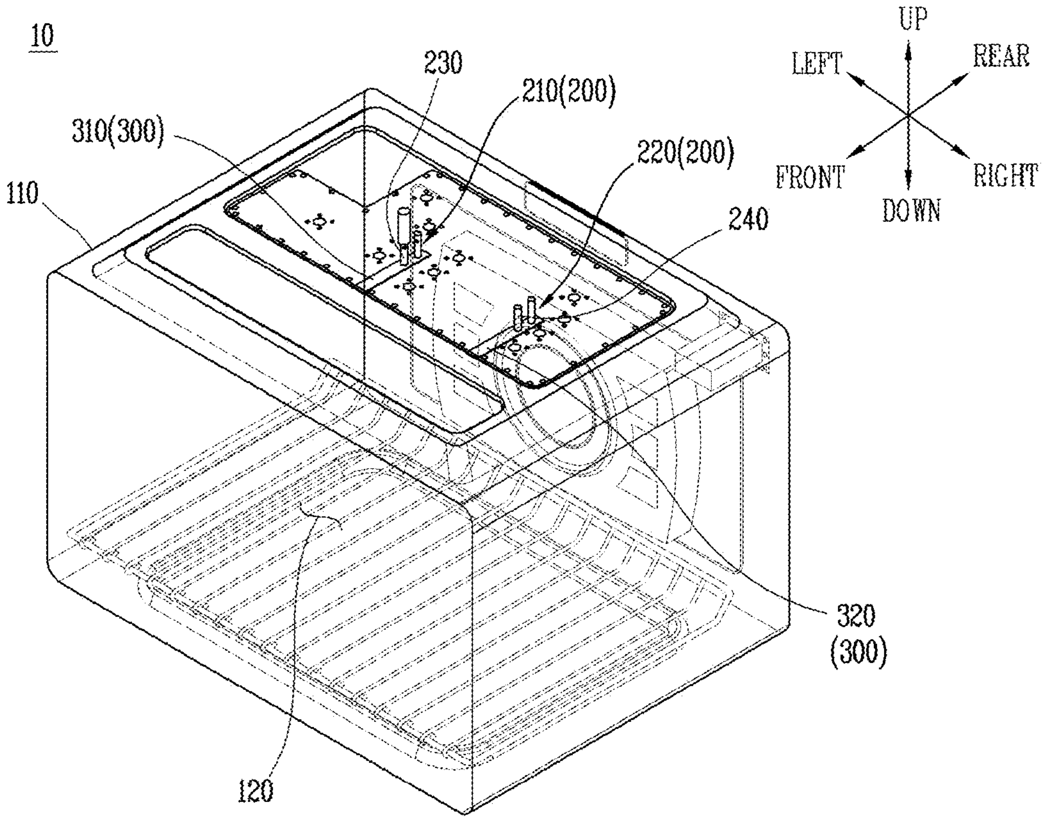
FIG. 1 is a transparent perspective view illustrating an exemplary oven.

Referring to FIG. 1, an oven 10 can include a housing 100, a radio wave generator 200, and a radio wave radiating device 300.

In addition, the oven 10 can further include a controller configured to control the plurality of radio wave radiating device. In some implementations, the controller can include a printed circuit board (PCB), a central processing unit (CPU), and the like.

The housing 100 defines an appearance of the oven 10. For example, the housing 100 is a portion where the oven 10 is exposed to an outside. The housing 100 can function as a case.

A space is provided inside the housing 100. Cooking ingredients can be accommodated in the space. In addition, the radio wave generator 200 configured to generate radio waves for heating cooking ingredients can be provided in the space.

As shown in FIG. 1, the housing 100 may be in a polyhedral shape having a rectangular cross section. The housing 100 can be provided in any shape capable of accommodating and heating cooking ingredients therein.

The housing 100 is electrically connected to the outside. Accordingly, the radio wave generator 200 accommodated in the housing 100 can be electrically connected to an external power source.

As shown in FIG. 1, the housing 100 can include an outer frame 110 and the cavity 120.

The outer frame 110 can define an outer side of the housing 100. In some implementations, the outer frame 110 can be a portion in which the housing 100 is exposed to the outside. Alternatively, the outer frame 110 can provide a frame of the housing 100.

A space is provided inside the outer frame 110. A part of the space can be defined as the cavity 120 in which cooking ingredients are accommodated.

The outer frame 110 can be made of an insulating material to prevent radio waves radiated from the radio wave radiating device 300 from being transmitted to the outer side of the housing 100. In addition, this is to prevent accidents such as an electric shock when a user of the oven 10 is come into contact with the outer frame 110.

In some implementations, the outer frame 110 can be made of a heat-resistant material to prevent damage caused by high heat generated inside the cavity 120.

The radio wave generator 200 and the radio wave radiating device 300 can be coupled to the outer frame 110. As shown in FIG. 1, the radio wave generator 200 can be located on a rear side of the outer frame 110. In addition, the radio wave radiating device 300 can be located on an upper side of the outer frame 110. In some implementations, the radio wave generator 200 and the radio wave radiating device 300 are not exposed to the outside.

The cavity 120 is provided inside the outer frame 110.

The cavity 120 is a space in which cooking ingredients are accommodated. The cavity 120 can be surrounded by the outer frame 110.

The cavity 120 can communicate with the outside as a door of the outer frame 110 is opened. A user can open the door to accommodate cooking ingredients in the cavity 120.

The radio wave generator 200 is located on one side of the cavity 120, which is an upper side as depicted in FIG. 1. Radio waves incident to the cavity 120 can be generated by the radio wave generator 200.

The radio wave radiating device 300 is provided on the one side of the cavity 120, which is the upper side as depicted in the FIG. 1. Radio waves can be incident to the cavity 120 through the radio wave radiating device 300. In some implementations, the radio wave radiating device 300 can be partially exposed inside the cavity 120. For the radiating device 300, an antenna or similar devices can be used.

The radio wave generator 200 generates radio waves for heating cooking ingredients accommodated in the cavity 120. The radio wave generator 200 is electrically connected to an external power source. The connection can be implemented in a wired manner by a conductor member.

Each component of the radio wave generator 200 can perform each function in real time and consecutively while the oven 10 is operating.

For example, while the oven 10 is operating, the radio wave generator 200 can generate and control radio waves, and detect incident radio waves and radiated radio waves in real time and consecutively.

As shown in FIG. 1, the radio wave generator 200 can include a first semiconductor generator module 210 and a second semiconductor generator module 220.

The first semiconductor generator module 210 generates a radio wave to be incident to the cavity 120 through a first radio wave radiating device 310. The first semiconductor generator module 210 is electrically connected to the first radio wave radiating device 310.

The first semiconductor generator module 210 is electrically connected to a power source provided in the controller. Electric power or the like needed in generating radio waves can be supplied from the power source.

The first semiconductor generator module 210 can be provided in an arbitrary form capable of receiving a direct current power and converting it into a radio wave in a radio wave form, and adjusting the intensity, phase, and frequency of the converted radio wave. In some implementations, the first semiconductor generator module 210 can be provided as a solid state power module (SSPM) having a semiconductor oscillator function.

The second semiconductor generator module 220 generates a radio wave to be incident to the cavity 120 through a second radio wave radiating device 320. The second semiconductor generator module 220 is electrically connected to the second radio wave radiating device 320.

The second semiconductor generator module 220 is electrically connected to the power source of the controller. Electric power or the like needed in generating radio waves can be supplied from the power source.

The second semiconductor generator module 220 can control various information regarding generated radio waves. For example, the second semiconductor generator module 220 can adjust the intensity, phase, and frequency of a generated radio wave.

The second semiconductor generator module 220 can be provided in an arbitrary form capable of receiving a direct current power and converting it into a radio wave in a radio wave form, and adjusting the intensity, phase, and frequency of the converted radio wave. In some implementations, the second semiconductor generator module 220 can be provided as a solid state power module (SSPM) having a semiconductor oscillator function.

The radio wave radiating device 300 receives radio waves generated by the radio wave generator 200 and whose intensity, phase, and frequency are adjusted. The radio wave radiating device 300 is electrically connected to the radio wave generator 200, specifically, a first signal transmitter and a second signal transmitter.

A radio wave transmitted to the radio wave radiating device 300 can be incident to the cavity 120. In some implementations, the radio wave radiating device 300 can be partially or entirely exposed to the cavity 120.

The radio wave radiating device 300 can be provided in plurality. The plurality of radio wave radiating devices 300 can be physically spaced apart from each other. In some implementations, the plurality of radio wave radiating devices 300 can be arranged so that a radio wave radiated from each radio wave radiating device 300 is not incident on other radio wave radiating devices 300.

For example, the plurality of radio wave radiating devices 300 can allow radio waves to be incident to the cavity 120 from different positions. In addition, the plurality of radio wave radiating devices 300 can receive radio waves reflected from the cavity 120 at different positions.

Accordingly, radio waves are incident on cooking ingredients accommodated in the cavity 120 from various positions. Therefore, the cooking ingredients accommodated in the cavity 120 can be quickly and effectively heated.

As shown in FIG. 1, two radio wave radiating devices 300, specifically, the first radio wave radiating device 310 and the second radio wave radiating device 320 are provided. The number of radio wave radiating devices 300 can be changed. In some implementations, more than two radio wave radiating devices 300 can be provided and each radio wave radiating device 300 can be spaced apart from each other.

In some implementations, the semiconductor generator modules 210 and 220 of the radio wave generator 200 are provided corresponding to the number of radio wave radiating devices 300. Further, each of the antennas 310 and 320 is electrically connected to each of the semiconductor generator modules 210 and 220 of the radio wave generator 200, respectively.

For example, one radio wave radiating device 300 can be electrically connected to one of the semiconductor generator modules 210 and 220.

Therefore, in each radio wave radiating device 300, each radio wave generated and controlled by different semiconductor generator modules 210 and 220 can be independently incident to the cavity 120.

Grounds 230 and 240 can be electrically connected to the radio wave radiating device 300, whereby the radio wave radiating device 300 is electrically connected to an earth.

A ground effect is generated in the radio wave radiating device 300 by the connection with the grounds 230 and 240, and accordingly, a radio wave in a lower band compared to a length of an actual radio wave radiating device 300 can be radiated through the radio wave radiating device 300 with an optimum efficiency.

For example, when a radio wave in a relatively low band are radiated with an optimum efficiency, the radio wave radiating device 300 can be miniaturized.

The grounds 230 and 240 are disposed at positions that can be connected to the radio wave radiating device 300 disposed in the cavity 120. In some implementations, the grounds 230 and 240 can be provided on an inner wall of the cavity 120.

As shown in FIG. 1, the grounds 230 and 240 can be electrically connected to the first radio wave radiating device 310 and the second radio wave radiating device 320.

In some implementations, if three or more radio wave radiating devices 300 are provided, three or more grounds 230 and 240 can be provided.

For example, the grounds 230 and 240 can be provided in a number corresponding to the number of the radio wave radiating devices 300.

Hereinafter, a structure and function of a radio wave radiating device 400 will be described with reference to FIGS. 2 to 3B.

The radio wave radiating device 400 can receive radio waves generated by the radio wave generator 200 and radiate them to the cavity 120.

The radio wave radiating device 400 can include a radio wave supply unit 411 that is a portion connected with the radio wave generator 200, an earth part 412 that is a portion connected with the grounds 230 and 240, and an antenna 420 coupled to the radio wave supply unit 411 and the earth part 412.

The radio wave supply unit 411 can be implemented as a connector that transmits radio waves generated by the radio wave generator 200 to the antenna 420.

Figure 2:
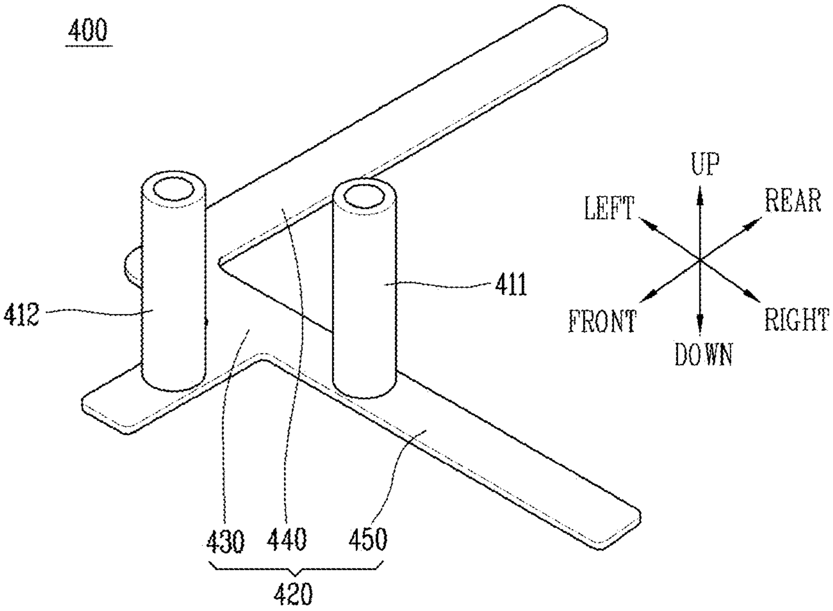
FIG. 2 is a perspective view illustrating an example of radio wave radiating device.

As shown in FIG. 2, the radio wave supply unit 411 extends in one direction and is defined in a cylindrical shape. The one direction in which the radio wave supply unit 411 extends can be defined as a vertical direction.

In some implementations, the radio wave supply unit 411 can be defined in a hollow body, wherein a conductive member coupled to a waveguide extending from the radio wave generator 200 can be provided inside the hollow body. The conducting member can be made of a copper or brass material.

As shown in FIG. 2, the earth part 412 extends in one direction and is defined in a cylindrical shape. The one direction in which the earth part 412 extends can be defined as a vertical direction.

In some implementations, the earth part 412 can be defined in a hollow body, wherein a conductive member coupled to terminals of the grounds 230 and 240 can be provided inside the hollow body. The conducting member can be made of a copper or brass material.

A length of the radio wave supply unit 411 in which the radio wave supply unit 411 extends in the vertical direction is shorter than a length of the earth part 412 in which the earth part 412 extends in the vertical direction.

In some implementations, a connector for connection with the radio wave supply unit 411 can be provided on the inner wall of the cavity 120. An upper end portion of the radio wave supply unit 411 can be connected to the connector to be electrically connected to the radio wave generator 200.

In some implementations, terminals of the grounds 230 and 240 can be provided on the inner wall of the cavity 120. An upper end portion of the earth part 412 can be connected to the terminal to be electrically connected to the earth.

Lower end portions of the radio wave supply unit 411 and the earth part 412 are electrically coupled to the antenna 420.

The antenna 420 can receive radio waves from the radio wave generator 200 through the radio wave supply unit 411 and radiate them to the cavity 120.

Accordingly, the antenna 420 is provided with a first coupling portion **420*a* that is electrically coupled to a lower end portion of the radio wave supply unit 411**.

In addition, the antenna 420 is provided with a second coupling portion **420*b* that is electrically coupled to a lower end portion of the earth part 412**.

The antenna 420 is defined in a shape in which a length thereof is longer than a width thereof, and is made of a material having an excellent electrical conductivity. In some implementations, the antenna 420 can be made of aluminum (Al), gold (Au), silver (Ag), copper (Cu), or the like.

Further, as shown in FIGS. 2 and 3, the antenna 420 has a rectangular cross section. However, the present disclosure is not limited thereto, and in some implementations, the antenna 420 can be implemented as a wire.

An efficiency in which the antenna 420 radiates radio waves can vary depending on frequencies of the radiated radio waves.

Depending on a length of the antenna 420, a band having an optimal radiation efficiency varies, and when a radio wave of a band that does not correspond to the length of the antenna 420 is radiated through the antenna 420, radio wave radiation efficiency can be reduced.

The length of the antenna 420 can be determined by a distance between the second coupling portion **420*b* coupled to the earth part 412 and the first coupling portion 420*a* coupled to the radio wave supply unit 411, and a distance between the first coupling portion 420*a* and one end portion of the antenna 420**.

Accordingly, a radio wave band radiated from the antenna 420 with an optimal radiation efficiency can be determined by the distance between the second coupling portion **420*b* and the first coupling portion 420*a*, and the distance between the first coupling portion 420*a* and one end portion of the antenna 420**.

The antenna 420 can include a middle portion 430 connecting between the radio wave supply unit 411 and the earth part 412, a first radiating portion 440 extending in a direction away from the earth part 412 from the middle portion 430, and a second radiating portion 450 extending in a direction away from the radio wave supply unit 411 from one end of the middle portion 430.

The middle portion 430 can refer to a member configured to connect between a portion where the first coupling portion **420*a* is provided and a portion where the second coupling portion 420*b*** is provided.

Figure 3A:
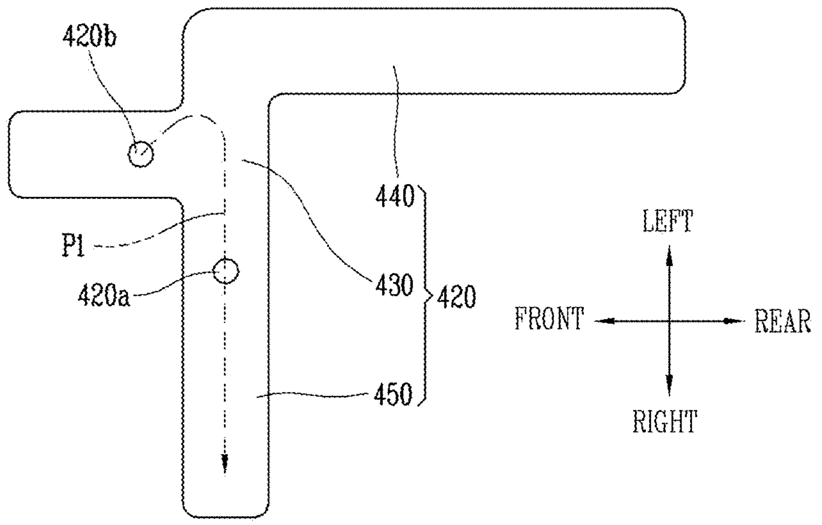
FIGS. 3A and 3B are planar views illustrating the radio wave radiating device of FIG. 2.
Figure 3B:
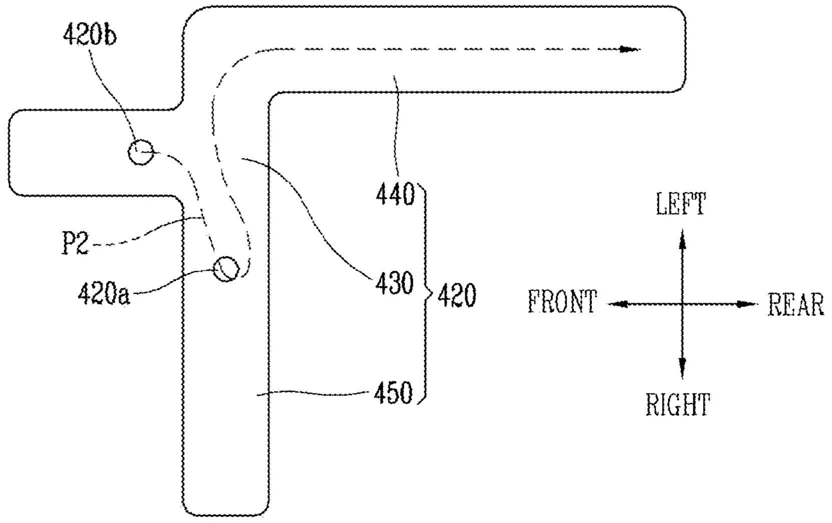

As shown in FIGS. 2 to 3B, the middle portion 430 extends to the rear, referring to the coordinate system in the drawing, by a predetermined distance from a portion where the second coupling portion **420*b* is provided and then is bent to the right, referring to the coordinate system in the drawing, to extend by a portion where the first coupling portion 420*a*** is provided.

The first radiating portion 440 protrudes from the middle portion 430 to extend in a direction away from the portion where the second coupling portion **420*b*** is provided.

As shown in FIGS. 3A and 3B, the first radiating portion 440 extends to the left, referring to the coordinate system in the drawing, by a predetermined length from a portion where the middle portion 430 is bent, and then extends to the rear. That is, the first radiating portion 440 includes a portion extending to the left and right and a portion extending to the front and rear.

However, the present disclosure is not limited thereto, and in some implementations, the first radiating portion 440 can extend in one direction without being bent.

The second radiating portion 450 extends from a portion where the first coupling portion **420*a* is provided, which is a right end portion of the middle portion 430, in a direction away from the first coupling portion 420*a***.

As shown in FIGS. 3A and 3B, the second radiating portion 450 extends to the right from the portion where the first coupling portion **420*a*** is provided.

However, the present disclosure is not limited thereto, and in some implementations, the second radiating portion 450 can be provided in a shape in which a middle portion thereof is bent.

Since the antenna 420 is provided with a plurality of radiating portions 440 and 450, frequency bands radiated with an optimal radiation efficiency can be provided in plurality.

Referring to FIGS. 3A and 3B, a length of the antenna 420 that determines frequency bands radiated with an optimal radiation efficiency is provided in plurality.

FIG. 3A illustrates a first path P1 in which a radio wave of a first band is radiated with an optimal radiation efficiency, and FIG. 3B illustrates a second path P2 in which a radio wave of a second band is radiated with an optimal radiation efficiency. In some implementations, the first band and the second band can be different bands.

A length of the first path P1 can be determined by a length of the middle portion 430 connecting between the second coupling portion 420*b* and the first coupling portion 420*a*, and a length of the second radiating portion 450.

In addition, a length of the second path P2 can be determined by the length of the middle portion 430 connecting between the second coupling portion 420*b* and the first coupling portion 420*a*, and a length of a member connecting between the first coupling portion 420*a* and an end portion of the first radiating portion 440.

The length of the first path P1 and the length of the second path P2 can be different from each other. Accordingly, the first band which is a frequency band radiated with an optimum efficiency when radiated through the first path P1 and the second band which is a frequency band radiated with an optimum efficiency when radiated through the second path P2 can be determined differently.

Therefore, the antenna 420 can radiate plural frequency bands from one body with an optimum efficiency.

Figure 8:
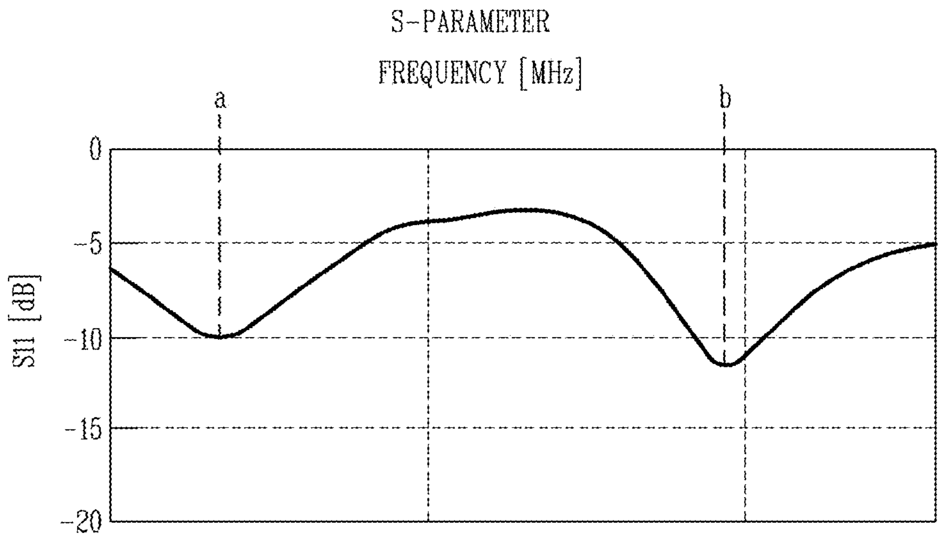
FIG. 8 is an exemplary graph showing a radiation efficiency of the radio wave radiating device.

Referring to FIG. 8, the radiation efficiency for each of the frequencies when frequencies are radiated through the antenna 420 is shown in a graph.

S-parameter is a numerical index of a ratio of a power of a frequency radiated from the antenna 420 in a predetermined band and a power of a frequency reflected without being absorbed by the cooking ingredients.

Specifically, the S-parameter is expressed in a numerical value obtained by dividing the power of the reflected frequency by the power of the radiated frequency as a log value. That is, the S-parameter is expressed in a negative value, and as the power of the reflected frequency decreases, the S-parameter is expressed in a negative value having a larger absolute value.

As shown in FIG. 8, the absolute values of the S-parameter are largest at frequency a and frequency b. In other words, the power of frequencies reflected at the frequency a and the frequency b is smaller compared to that of adjacent frequencies.

The smaller the power of reflected frequency is, the better efficiency of the frequency being absorbed by the cooking ingredients, and thus has an optimal radiation efficiency at the frequency a and the frequency b.

As a result, the antenna 420 can have an optimal radiation efficiency at plural frequency bands in one body.

Since one antenna 420 has an optimal radiation efficiency at plural frequency bands, heating patterns due to radio wave radiation can be varied.

Therefore, an optimal heating pattern for the cooking ingredients can be implemented.

As a result, a performance of uniformly heating the cooking ingredients and a performance of defrosting the cooking ingredients can be improved, and the time required for cooking can be shortened.

Figure 4:
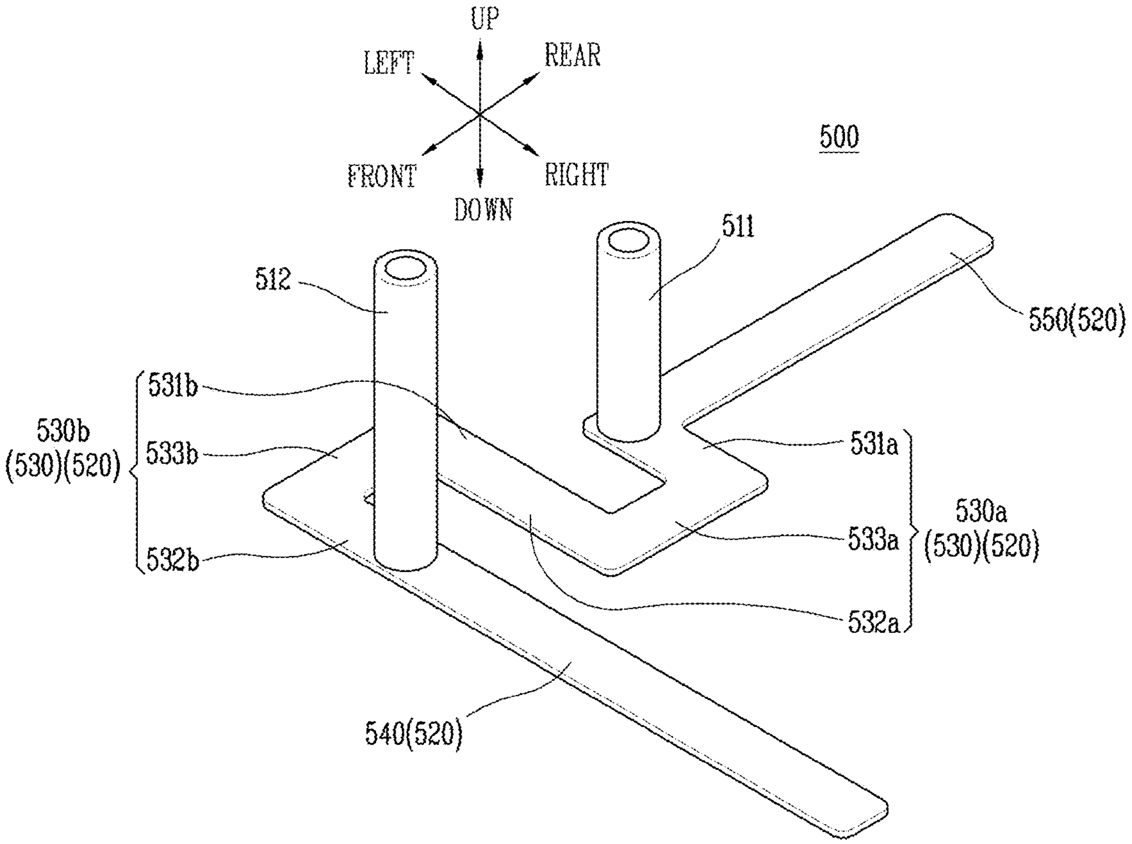
FIG. 4 is a perspective view illustrating another example of radio wave radiating device.

Referring to FIG. 4, another example of radio wave radiating device 500 is illustrated.

When comparing the radio wave radiating device 500 of FIG. 4 with the radio wave radiating device 400 described in FIGS. 2 to 3B, the radio wave radiating device 500 of FIG. 4 has the following differences.

Firstly, a radio wave supply unit 511 and an earth part 512 provided in the radio wave radiating device 500 are implemented identical to the radio wave supply unit 411 and the earth part 412 provided in the radio wave radiating device 400.

However, an antenna 520 of the radio wave radiating device 500 is implemented differently from the antenna 420 of the radio wave radiating device 400.

The antenna 520 receives a radio wave from the radio wave generator 200 through the radio wave supply unit 511 and radiates the radio wave to the cavity 120.

Accordingly, the antenna 520 is provided with a first coupling portion that is electrically coupled to the lower end portion of the radio wave supply unit 411.

In addition, the antenna 520 is provided with a second coupling portion that is electrically coupled to a lower end portion of the earth part 512.

The antenna 520 is defined in a shape in which a length thereof is longer than a width thereof, and is made of a material having an excellent electrical conductivity. In some implementations, the antenna 520 can be made of aluminum (Al), gold (Au), silver (Ag), copper (Cu), or the like.

The length of the antenna 520 has been described above with respect to FIGS. 2 and 3, and will not be repeated. In addition, a formation of a plurality of bands having an optimal radiation efficiency due to radiating portions 540 and 550 being provided in plurality has been described above, and will not be repeated.

The antenna 520 includes a middle portion 530 connecting between the radio wave supply unit 511 and the earth part 512, a first radiating portion 540 extending in a direction away from the earth part 512 from the middle portion 530, and a second radiating portion 550 extending in a direction away from the radio wave supply unit 511 from one end of the middle portion 530.

The middle portion 530 refers to a member configured to connect between a portion where the first coupling portion is provided and a portion where the second coupling portion is provided.

As shown in FIG. 4, the middle portion 530 can be provided in a curved shape extending in a direction intersecting with a virtual line connecting a lower end of the radio wave supply unit 511 and a lower end of the earth part 512 with a shortest distance.

For example, the virtual line connecting the lower end of the radio wave supply unit 511 and the lower end of the earth part 512 with the shortest distance extends in a front-rear direction, and the middle portion 530 provided to extend in the left-right direction in a curved shape.

A curved portion of the middle portion 530 on the left is provided such that an end extends to the left by a predetermined length, bent to extend to the rear by a predetermined length, and then bent to extend to the right, in a sequential manner. That is, the curved portion of the middle portion 530 extending to the left is provided to protrude to the left.

In addition, a curved portion of the middle portion 530 on the right is provided such that an end extends to the right by a predetermined length, bent to extend to the front by a predetermined length, and then bent to extend to the left, in a sequential manner. That is, the curved portion of the middle portion 530 extending to the right is provided to protrude to the right.

For example, the middle portion 530 includes bending patterns extending in any one direction intersecting with the virtual line connecting the lower end of the radio wave supply unit 511 and the lower end of the earth part 512 with a shortest distance.

As shown in FIG. 4, bending patterns 530*a* and 530*b* are provided to extend to the left or to the right in a curved shape.

The bending patterns 530*a* and 530*b* include at least one first bending pattern 530*a* extending in one direction in a curved shape, and at least one second bending pattern 530*b* extending in another direction which is different from the one direction. The one direction and the right direction is a direction intersecting with a virtual line connecting between the lower end of the radio wave supply unit 511 and the lower end of the earth part 512 with a shortest distance.

The first bending pattern 530*a* and the second bending pattern 530*b* can extend in opposite directions.

As shown in FIG. 4, the first bending pattern 530*a* extends to the left and the second bending pattern 530*b* extends to the right. However, the present disclosure is not limited thereto.

In some implementations, the first bending pattern 530*a* and the second bending pattern 530*b* can extend to the left and to the right.

The first bending pattern 530*a* and the second bending pattern 530*b* can be disposed on a same plane.

As shown in FIG. 4, the first bending pattern 530*a* and the second bending pattern 530*b* can be disposed on a plane in a direction intersecting with a vertical direction.

The first bending pattern 530*a* includes a pair of first extending members 531*a* and 532*a* extending to the left, and spaced apart from each other by a predetermined distance in a direction connecting between the lower end of the radio wave supply unit 511 and the lower end of the earth part 512 with a shortest distance. End portions of the pair of first extending members 531*a* and 532*a* on the left are connected by a first connecting member 533*a*.

The pair of first extending members 531*a* and 532*a* and the first connecting member 533*a* can have different lengths and different widths.

For example, widths in a front-rear direction of the pair of first extending members 531*a* and 532*a* can be provided differently. In addition, lengths in the left-right direction of the pair of first extending members 531*a* and 532*a* can be provided differently. In addition, the width in the front-rear direction of the pair of first extending members 531*a* and 532*a* can be provided differently from a width in the left-right direction of the first connecting member 533*a*.

As shown in FIG. 4, the pair of first extending members 531*a* and 532*a* extends in the left-right direction, and the first connecting member 533*a* extends in the front-rear direction.

At least a portion of the pair of first extending members 531*a* and 532*a* overlaps each other in the direction connecting between the lower end of the radio wave supply unit 511 and the lower end of the earth part 512 with a shortest distance.

As shown in FIG. 4, at least a portion of the pair of first extending members 531*a* and 532*a* overlaps each other in the front-rear direction.

In FIG. 4, the pair of first extending members 531*a* and 532*a* and the first connecting member 533*a* are connected to each other at a predetermined angle. In some implementations, the pair of first extending members 531*a* and 532*a* and the first connecting member 533*a* can be connected to each other in an orthogonal direction.

In addition, each of portions where the pair of first extending members 531*a* and 532*a* and the first connecting member 533*a* are connected can be provided in a curved shape. Here, the first bending pattern 530*a* is provided to extend to the left in a curved shape.

The second bending pattern 530*b* includes a pair of second extending members 531*b* and 532*b* extending to the right, and spaced apart from each other by a predetermined distance in a direction connecting between the lower end of the radio wave supply unit 511 and the lower end of the earth part 512 with a shortest distance. End portions of the pair of second extending members 531*b* and 532*b* on the right are connected by a second connecting member 533*b*.

The pair of second extending members 531*b* and 532*b* and the second connecting member 533*b* can have different lengths and different widths.

For example, widths in the front-rear direction of the pair of second extending members 531*b* and 532*b* can be provided differently. In addition, lengths in the left-right direction of the pair of second extending members 531*b* and 532*b* can be provided differently. In addition, the width in the front-rear direction of the pair of second extending members 531*b* and 532*b* can be provided differently from a width in the left-right direction of the second connecting member 533*b*.

As shown in FIG. 4, the pair of second extending members 531*b* and 532*b* extends in the left-right direction, and the second connecting member 533*b* extends in the front-rear direction.

In addition, a left end of the second extending member 531*b* is integrally connected with a right end of the first extending member 532*a*.

At least a portion of the pair of second extending members 531*b* and 532*b* overlaps each other in the direction connecting between the lower end of the radio wave supply unit 511 and the lower end of the earth part 512 with a shortest distance.

As shown in FIG. 4, at least a portion of the pair of second extending members 531*b* and 532*b* overlaps each other in the front-rear direction.

In FIG. 4, the pair of second extending members 531*b* and 532*b* and the second connecting member 533*b* are connected to each other at a predetermined angle. In some implementations, the pair of second extending members 531*b* and 532*b* and the second connecting member 533*b* can be connected to each other in an orthogonal direction.

In addition, each of portions where the pair of second extending members 531*b* and 532*b* and the second connecting member 533*b* are connected can be provided in a curved shape. Here, the second bending pattern 530*b* is provided to extend to the right in a curved shape.

As shown in FIG. 4, the bending pattern includes both the first bending pattern 530*a* and the second bending pattern 530*b*. However, the present disclosure is not limited thereto, and in some implementations, the bending pattern can include either the first bending pattern 530*a* or the second bending pattern 530*b*.

The first radiating portion 540 protrudes from a portion connected to the earth part 512 and extends in a direction away from the earth part 512 coupled to the second coupling portion 520*b*.

As shown in FIG. 4, the first radiating portion 540 extends to the left by a predetermined length from a portion where the middle portion 530 is connected to the earth part 512.

However, the present disclosure is not limited thereto, and in some implementations, the first radiating portion 540 can be provided in a curved shape.

The second radiating portion 550 extends from a portion where middle portion 530 is connected to the radio wave supply unit 511, in a direction away from the radio wave supply unit 511.

As shown in FIG. 4, the second radiating portion 550 extends to the rear from the portion where middle portion 530 is connected to the radio wave supply unit 511.

However, the present disclosure is not limited thereto, and in some implementations, the second radiating portion 550 can be provided in a shape in which a middle portion thereof is bent.

Since the antenna 520 includes a plurality of radiating portions 540 and 550, the antenna 520 has a maximum radiation efficiency at plural frequency bands.

In addition, since the middle portion 530 is provided in a curved shape from a point connected to the radio wave supply unit 511 to a point connected to the earth part 512, a shortest distance between the point connected to the radio wave supply unit 511 and the point connected to the earth part 512 can be shorter than a total length of the middle portion 530.

Accordingly, the radio wave radiating device 500 can be miniaturized.

When the difference between the plural frequency bands having the maximum radiation efficiency is large, the length of the middle portion 530 can be further increased. In this case, a size of the radio wave radiating device 500 can be excessively increased.

However, according to the implementation of the radio wave radiating device 500 of FIG. 4, as the middle portion 530 is provided to be curved between the radio wave supply unit 511 and the earth part 512, the shortest distance between the radio wave supply unit 511 and the earth part 512 can be reduced compared to the actual length of the middle portion 530.

In addition, each end of the middle portion 530 is connected to the radio wave supply unit 511 and the earth part 512 that are coupled to a transmission connector and a ground terminal fixed to the inner wall of the cavity 120, respectively.

Accordingly, the radio wave supply unit 511 and the earth part 512 are fixed to the inner wall of the cavity 120, whereby positions of both ends of the middle portion 530 connected to the radio wave supply unit 511 and the earth part 512 are determined by the radio wave supply unit 511 and the earth part 512.

Therefore, in order to increase the length of the middle portion 530, shapes of the radio wave supply unit 511 and the earth part 512, or installation locations of the transmission connector connected to the radio wave supply unit 511 and the ground terminal connected to the earth part 512 must be changed.

However, according to the implementation of the radio wave radiating device 500 of FIG. 4, since the middle portion 530 is provided in a curved shape, the length of the middle portion 530 can be increased without changing the shapes of the radio wave supply unit 511 and the earth part 512, or the installation locations of the transmission connector connected to the radio wave supply unit 511 and the ground terminal connected to the earth part 512.

As a result, a difference between plural frequency bands having a maximum radiation efficiency can be increased without changing configurations except the middle portion 530.

Figure 5:
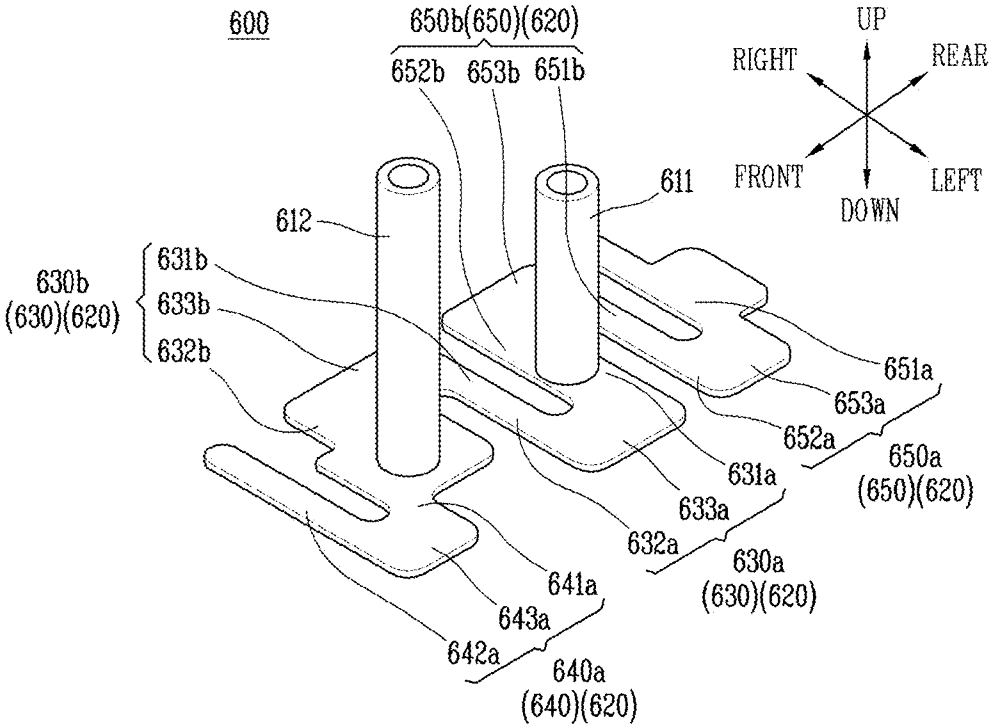
FIG. 5 is a perspective view illustrating still another example of radio wave radiating device.
Figure 6A:
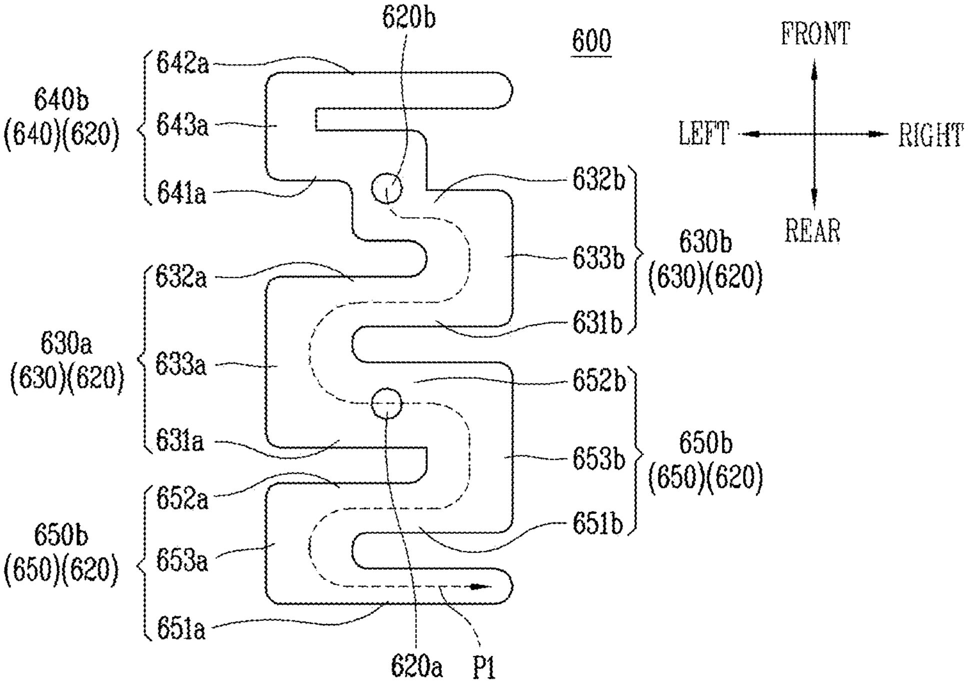
FIGS. 6A and 6B are planar views illustrating the radio wave radiating device of FIG. 5.
Figure 6B:
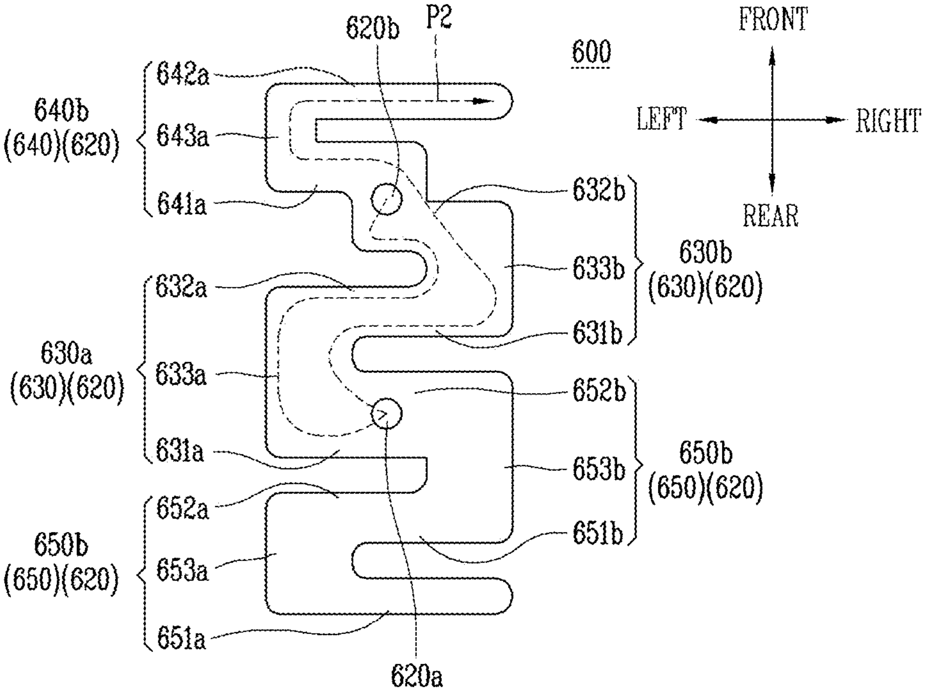

Referring to FIGS. 5 to 6B, another example of radio wave radiating device 600 is illustrated.

When comparing the radio wave radiating device 600 of FIGS. 5 to 6B with the radio wave radiating device 500 described in FIG. 4, the radio wave radiating device 600 has the following differences.

Firstly, a radio wave supply unit 611 and an earth part 612 provided in the radio wave radiating device 600 are implemented identical to the radio wave supply unit 511 and the earth part 512 provided in the radio wave radiating device 500.

In addition, a middle portion 630 provided in the radio wave radiating device 600 is provided similar to the middle portion 530 provided in the radio wave radiating device 500.

That is, the middle portion 630 includes a first bending pattern 630*a* having first extending members 631*a* and 632*a* and a first connecting member 633*a*, and a second bending pattern 630*b* having second extending members 631*b* and 632*b* and a second connecting member 633*b*.

Since the first bending pattern 630*a* and the second bending pattern 630*b* have structures and functions similar to the bending patterns 530*a* and 530*b* described above with respect to FIG. 4, a description thereof will not be repeated.

A first radiating portion 640 and a second radiating portion 650 provided in an antenna 620 in FIG. 5 are modified from the first radiating portion 540 and the second radiating portion 550.

The antenna 620 receives a radio wave from the radio wave generator 200 through the radio wave supply unit 611 and radiates the radio wave to the cavity 120.

Accordingly, the antenna 620 is provided with a first coupling portion 620*a* that is electrically coupled to a lower end portion of the radio wave supply unit 611.

In addition, the antenna 620 is provided with a second coupling portion 620*b* that is electrically coupled to a lower end portion of the earth part 612.

The antenna 620 is defined in a shape in which a length thereof is longer than a width thereof, and is made of a material having an excellent electrical conductivity. In some implementations, the antenna 620 can be made of aluminum (Al), gold (Au), silver (Ag), copper (Cu), or the like.

The length of the antenna 620 has been described above, and will not be repeated. In addition, a formation of a plurality of bands having an optimal radiation efficiency due to radiating portions 640 and 650 being provided in plurality has been described above, and will not be repeated.

The antenna 620 includes a middle portion 630 connecting between the radio wave supply unit 611 and the earth part 612, a first radiating portion 640 extending in a direction away from the earth part 612 from the middle portion 630, and a second radiating portion 650 extending in a direction away from the radio wave supply unit 611 from one end of the middle portion 630.

At least one of the first radiating portion 640 and the second radiating portion 650 includes a bending pattern extending in one direction in a curved shape. The one direction can be a direction intersecting with the extending direction of the first radiating portion or the second radiating portion.

As shown in FIGS. 5 to 6B, the first radiating portion 640 extends to the front, and the first radiating portion 640 includes the first bending pattern 640*a* extending to the left which is a direction intersecting with the front-rear direction.

The first bending pattern 640*a* includes a pair of first extending members 641*a* and 642*a* extending to the left, and spaced apart from each other by a predetermined distance in the front-rear direction in which the first radiating portion 640 extends. End portions of the pair of first extending members 641*a* and 642*a* on the left are connected by a first connecting member 643*a*.

As shown in FIGS. 5 to 6B, the pair of first extending members 641*a* and 642*a* extends in the left-right direction, and the first connecting member 643*a* extends in the front-rear direction.

At least a portion of the pair of first extending members 641*a* and 642*a* overlaps each other in the front-rear direction in which the first radiating portion 640 extends.

As shown in FIGS. 5 to 6B, the pair of first extending members 641*a* and 642*a* and the first connecting member 643*a* are connected to each other at a predetermined angle. In some implementations, the pair of first extending members 641*a* and 642*a* and the first connecting member 643*a* can be connected to each other in an orthogonal direction.

In addition, each of portions where the pair of first extending members 641*a* and 642*a* and the first connecting member 643*a* are connected can be provided in a curved shape. Here, the first bending pattern 640*a* is provided to extend to the left in a curved shape.

As shown in FIGS. 5 to 6B, the first radiating portion 640 only includes the first bending pattern 640*a* extending to the left. However, the present application is not limited thereto, and in some implementations, the first radiating portion 640 includes at least one first bending pattern 640*a* and/or at least one second bending pattern. Here, the second bending pattern refers to a pattern that extends in a direction opposite to the direction in which the first bending pattern 640*a* extends.

As shown in FIGS. 5 to 6B, the first radiating portion 650 extends to the rear, and the first radiating portion 650 includes a first bending pattern 650*a* extending to the left and a second bending pattern 650*b* extending to the right.

The first bending pattern 650*a* includes a pair of first extending members 651*a* and 652*a* extending to the left, and spaced apart from each other by a predetermined distance to the front-rear direction in which the first radiating portion 650 extends. End portions of the pair of first extending members 651*a* and 652*a* on the left are connected by a first connecting member 653*a*.

As shown in FIGS. 5 and 6, the pair of first extending members 651*a* and 652*a* extends in the left-right direction, and the first connecting member 653*a* extends in the front-rear direction.

At least a portion of the pair of first extending members 651*a* and 652*a* overlaps each other in a direction in which the second radiating portion 650 extends.

As shown in FIGS. 5 to 6B, at least a portion of the pair of first extending members 651*a* and 652*a* overlaps each other in the front-rear direction.

In FIGS. 5 to 6B, the pair of first extending members 651*a* and 652*a* and the first connecting member 653*a* are connected to each other at a predetermined angle. In some implementations, the pair of first extending members 651*a* and 652*a* and the first connecting member 653*a* can be connected to each other in an orthogonal direction.

In addition, each of portions where the pair of first extending members 651*a* and 652*a* and the first connecting member 653*a* are connected can be provided in a curved shape. Here, the first bending pattern 650*a* is provided to extend to the left in a curved shape.

The second bending pattern 650*b* includes a pair of second extending members 651*b* and 652*b* extending to the right, and spaced apart from each other by a predetermined distance in the front-rear direction in which the second radiating portion 650 extends. End portions of the pair of first extending members 651*b* and 652*b* on the right are connected by a second connecting member 653*b*.

As shown in FIGS. 5 and 6, the pair of second extending members 651*b* and 652*b* extends in the left-right direction, and the second connecting member 653*b* extends in the front-rear direction.

In addition, a left end of the second extending member 651*b* is integrally connected with a right end of the first extending member 652*a*.

At least a portion of the pair of second extending members 651*b* and 652*b* overlaps each other in the front-rear direction in which the second radiating portion 650 extends.

As shown in FIGS. 5 to 6B, at least a portion of the pair of second extending members 651*b* and 652*b* overlaps each other in the front-rear direction.

In FIGS. 5 to 6B, the pair of second extending members 651*b* and 652*b* and the second connecting member 653*b* are connected to each other at a predetermined angle. In some implementations, the pair of second extending members 651*b* and 652*b* and the second connecting member 653*b* can be connected to each other in an orthogonal direction.

In addition, each of portions where the pair of second extending members 651*b* and 652*b* and the second connecting member 653*b* are connected can be provided in a curved shape. Here, the second bending pattern 650*b* is provided to extend to the right in a curved shape.

As shown in FIGS. 5 to 6B, the bending pattern includes both the first bending pattern 650*a* and the second bending pattern 650*b*. However, the present disclosure is not limited thereto, and in some implementations, the bending pattern can include either the first bending pattern 650*a* or the second bending pattern 650*b*.

Since the antenna 620 includes a plurality of radiating portions 640 and 650, the antenna 620 has a maximum radiation efficiency at plural frequency bands.

In addition, since the first radiating portion 640 and the second radiating portion 650 extends in the front-rear direction in curved shapes, a distance between a portion connected to the radio wave supply unit 611 and an end portion of the second radiating portion 650, and a distance between a portion connected to the earth part 612 and an end portion of the first radiating portion 640 can be shortened. As a result, the radio wave radiating device 600 can be miniaturized.

When the radio wave radiating device 600 is formed too long, an area occupied by the radio wave radiating device 600 can be increased compared to an actual portion of the radio wave radiating device 600.

In this case, the area occupied by the radio wave radiating device 600 can be reduced by forming the first radiating portion 640 and the second radiating portion 650 in a compact manner.

Figure 7:
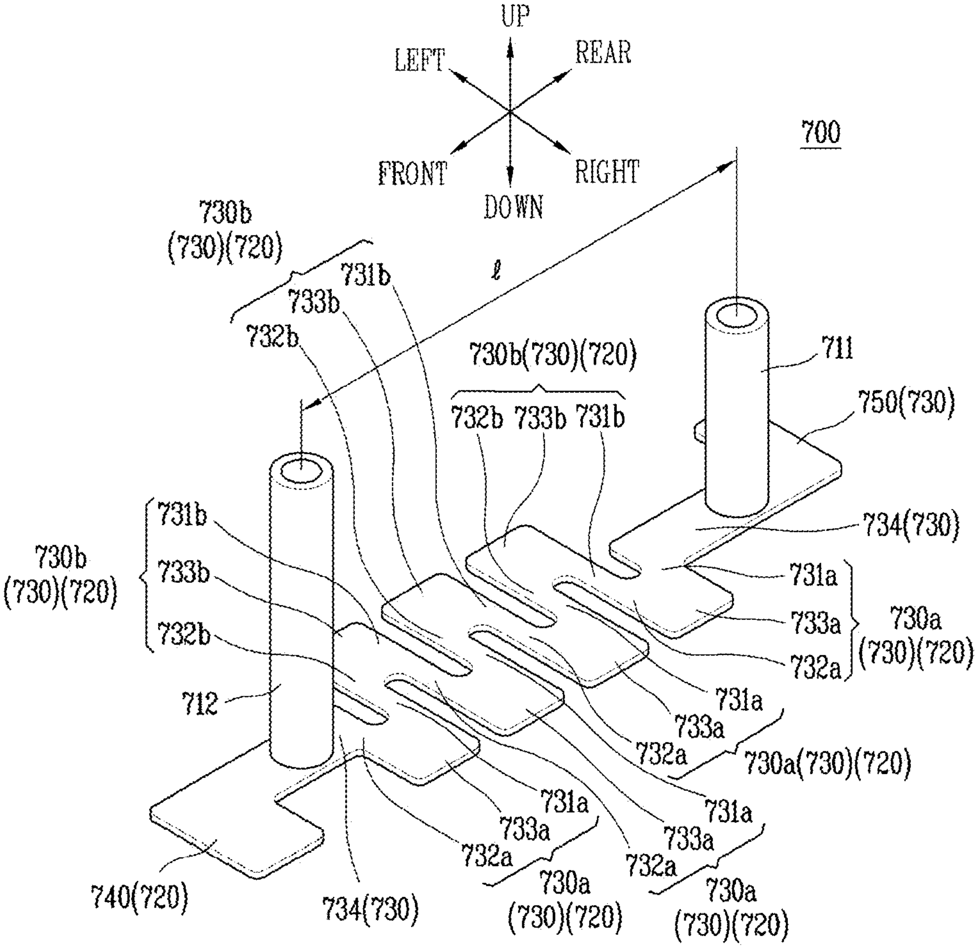
FIG. 7 is a perspective view illustrating still another example of radio wave radiating device.

Referring to FIG. 7, still another example of radio wave radiating device 700 is illustrated.

When comparing the radio wave radiating device 700 of FIG. 7 with the radio wave radiating device 500 described in FIG. 4, the radio wave radiating device 700 has the following differences.

Firstly, a radio wave supply unit 711 and an earth part 712 provided in the radio wave radiating device 700 are implemented identical to the radio wave supply unit 511 and the earth part 512 provided in the radio wave radiating device 500.

In addition, a middle portion 730 provided in the radio wave radiating device 700 is provided similar to the middle portion 530 provided in the radio wave radiating device 500.

That is, the middle portion 730 includes a first bending pattern 730*a* having first extending members 731*a* and 732*a* and a first connecting member 733*a*, and a second bending pattern 730*b* having second extending members 731*b* and 732*b* and a second connecting member 733*b*.

Since the first bending pattern 730*a* and the second bending pattern 730*b* have structures and functions similar to the bending patterns 530*a* and 530*b*, a description thereof will not be repeated.

However, the middle portion 730 includes a plurality of first bending patterns 730*a* and second bending patterns 730*b*.

As shown in FIG. 7, the middle portion 730 includes four first bending patterns 730*a* and three second bending patterns 730*b*. Accordingly, the first bending patterns 730*a* and the second bending patterns 730*b* can be provided in numbers that do not correspond to each other.

A first bending pattern 730*a* disposed at a rearmost side of the plurality of first bending patterns 730*a* is connected to an extending member 734 extending from a portion connected to the radio wave supply unit 711 to the rear. In addition, a first bending pattern 730*a* disposed at a frontmost side of the plurality of first bending patterns 730*a* is connected to an extending member 734 extending from a portion connected to the earth part 712 to the front.

Although the foregoing description has been given with reference to the preferred implementations, it will be understood that those skilled in the art will be able to variously modify and change the present disclosure without departing from the scope of the disclosure described in the claims below.

What is claimed is:

1. A radio wave radiating device, comprising:

a radio wave supply unit configured to transmit a radio wave and extending in one direction, one end of the radio wave supply unit being electrically connected to an external power source;

an earth part spaced apart from the radio wave supply unit by a predetermined distance in a direction intersecting with the one direction, extending in the one direction, one end of the earth part being electrically connected to a ground; and a radiating element electrically connected to another end of the radio wave supply unit and another end of the earth part, respectively, and configured to radiate the radio wave received from the radio wave supply unit, wherein the radiating element comprises:

a middle portion connecting the radio wave supply unit and the earth part;

a first radiating portion extending from the middle portion connected to the earth part, in a direction away from the earth part and the middle portion; and a second radiating portion extending from an end of the middle portion connected to the radio wave supply unit, in a direction away from the radio wave supply unit and the middle portion, wherein the middle portion comprises a bending pattern extending in a curved shape, wherein the first radiating portion includes at least one bending pattern extending in the curved shape, and wherein the second radiating portion includes at least one bending pattern extending in the curved shape.

2. The device of claim 1, wherein the middle portion is provided in the curved shape extending in a direction that intersects a virtual line connecting the another end of the radio wave supply unit and the another end of the earth part in a shortest distance.

3. The device of claim 1, wherein a direction in which the bending pattern of the middle portion extends is a direction that intersects a virtual line connecting the another end of the radio wave supply unit and the another end of the earth part in a shortest distance.

4. The device of claim 1, wherein the middle portion comprises:

at least one first bending pattern extending in a first direction in the curved shape; and at least one second bending pattern extending in a second direction that is different from the first direction in the curved shape, and wherein the first direction and the second direction are directions that intersect a virtual line connecting the another end of the radio wave supply unit and the another end of the earth part in a shortest distance.

5. The device of claim 4, wherein the first bending pattern and the second bending pattern are disposed on a same plane.

6. The device of claim 4, wherein the first direction in which the first bending pattern extends and the second direction in which the second bending pattern extends are opposite directions.

7. The device of claim 4, wherein the first bending pattern comprises:

a pair of first extending members extending in the first direction and spaced apart from each other by a predetermined distance in a direction connecting the another end of the radio wave supply unit and the another end of the earth part in a shortest distance; and a first connecting member configured to connect each first end of each of the pair of first extending members to each other, and wherein at least a portion of each of the pair of first extending members overlaps each other in the direction connecting the another end of the radio wave supply unit and the another end of the earth part in the shortest distance.

8. The device of claim 7, wherein each of portions where the pair of first extending members and the first connecting member are connected is provided in the curved shape.

9. The device of claim 7, wherein each of the first extending members and the first connecting member are connected to each other at a predetermined angle.

10. The device of claim 4, wherein the second bending pattern comprises:

a pair of second extending members extending in the second direction, and spaced apart from each other by a predetermined distance in a direction connecting the another end of the radio wave supply unit and the another end of the earth part in a shortest distance; and a second connecting member configured to connect each first end of each of the pair of second extending members to each other, and wherein at least a portion of each of the pair of second extending members overlaps each other in the direction connecting the another end of the radio wave supply unit and the another end of the earth part in the shortest distance.

11. The device of claim 10, wherein each of portions where the pair of second extending members and the second connecting member are connected is provided in the curved shape.

12. The device of claim 10, wherein each of the second extending members and the second connecting member are connected to each other at a predetermined angle.

13. The device of claim 1, wherein the at least one bending pattern extends in a direction intersecting an extending direction of at least one of the first radiating portion or the second radiating portion.

14. The device of claim 13, wherein the at least one bending pattern comprises:

a pair of extending members extending in the direction in the curved shape and spaced apart from each other by a predetermined distance in the extending direction of at least one of the first radiating portion or the second radiating portion; and a connecting member configured to connect each first end of each of the pair of extending members to each other in the extending direction, and wherein at least a portion of each of the pair of extending members overlaps each other in the extending direction of at least one of the first radiating portion or the second radiating portion.

15. The device of claim 1, wherein at least one of the first radiating portion or the second radiating portion comprises:

at least one first bending pattern extending in a first direction in the curved shape; and at least one second bending pattern extending in a second direction that is different from the first direction, and wherein the first direction and the second direction are directions intersecting an extending direction of at least one of the first radiating portion or the second radiating portion.

16. The device of claim 15, wherein the first bending pattern comprises:

a pair of first extending members extending in the first direction and spaced apart from each other by a predetermined distance in the extending direction of at least one of the first radiating portion or the second radiating portion; and a first connecting member configured to connect each first end of each of the pair of first extending members to each other, and wherein at least a portion of each of the pair of first extending members overlaps each other in the extending direction of at least one of the first radiating portion or the second radiating portion, wherein the second bending pattern comprises:

a pair of second extending members extending in the second direction and spaced apart from each other by a predetermined distance in the extending direction of at least one of the first radiating portion or the second radiating portion; and a second connecting member configured to connect each first end of each of the pair of second extending members to each other, and wherein at least a portion of each of the pair of second extending members overlaps each other in the extending direction of at least one of the first radiating portion or the second radiating portion.

17. The device of claim 1, wherein the first radiating portion includes a first bending pattern and a second bending pattern that extends in a direction opposite to the direction in which the first bending pattern extends, and wherein the second radiating portion includes a third bending pattern and a fourth bending pattern that extends in a direction opposite to the direction in which the third bending pattern extends.

18. An oven, comprising:

a housing defining a cavity;

a radio wave supply unit configured to transmit a radio wave and extending in one direction toward an inner wall of the cavity, one end of the radio wave supply unit being electrically connected to an external power source that is located outside the cavity;

an earth part spaced apart from the radio wave supply unit by a predetermined distance in a direction intersecting the one direction and extending in the one direction to be coupled to the inner wall of the cavity; and a radiating element electrically connected to another end of the radio wave supply unit and an end of the earth part, respectively, and configured to radiate the radio wave received from the radio wave supply unit toward the cavity, wherein the radiating element comprises:

a middle portion connecting the radio wave supply unit and the earth part;

a first radiating portion extending from the middle portion connected to the earth part, in a direction away from the earth part and the middle portion; and a second radiating portion extending from an end of the middle portion connected to the radio wave supply unit, in a direction away from the radio wave supply unit and the middle portion, wherein the middle portion comprises a bending pattern extending a curved shape, wherein the first radiating portion includes at least one bending pattern extending in the curved shape, and wherein the second radiating portion includes at least one bending pattern extending in the curved shape.

19. The oven of claim 18, wherein a direction in which the middle portion extends is a direction that intersects a virtual line connecting the another end of the radio wave supply unit and the end of the earth part in a shortest distance.

* * * * *